(12) United States Patent
Agtuca

(10) Patent No.: US 6,681,901 B2
(45) Date of Patent: Jan. 27, 2004

(54) AIRCRAFT TIRE CHOCK

(76) Inventor: Peter Agtuca, 7867 S. 180th, Kent, WA (US) 98032

( * ) Notice: Subject to any disclaimer, the term of this patent is extended or adjusted under 35 U.S.C. 154(b) by 23 days.

(21) Appl. No.: 09/904,881

(22) Filed: Jul. 12, 2001

(65) Prior Publication Data

US 2002/0005321 A1 Jan. 17, 2002

Related U.S. Application Data

(60) Provisional application No. 60/217,982, filed on Jul. 13, 2000.

(51) Int. Cl.$^7$ ................................................. B60T 3/00
(52) U.S. Cl. ........................ 188/32; 188/4 R; D12/217
(58) Field of Search ..................... 188/32, 4 R, 4 B, 188/5, 23, 36; D12/217

(56) References Cited

U.S. PATENT DOCUMENTS

| | | | |
|---|---|---|---|
| 2,992,704 A | | 7/1961 | Showker et al. ............. 188/32 |
| 3,065,680 A | * | 11/1962 | Wiedman, Sr. .............. 188/32 |
| 3,557,909 A | * | 1/1971 | Neumann ................... 188/32 |
| 3,664,466 A | * | 5/1972 | Rotheiser .................. 188/32 |
| 3,720,406 A | * | 3/1973 | Artz ....................... 267/139 |
| 3,993,167 A | * | 11/1976 | Reed ....................... 188/32 |
| 4,034,961 A | * | 7/1977 | Breen .................... 188/32 X |
| 4,615,416 A | | 10/1986 | Wilson ..................... 188/32 |
| D404,001 S | * | 1/1999 | Henry ..................... D12/217 |

* cited by examiner

Primary Examiner—Pam Rodriguez
(74) Attorney, Agent, or Firm—Dean A. Craine

(57) ABSTRACT

An aircraft tire chock comprising a triangular-shaped elongated body designed to fit against the surface of a tire on an aircraft. The body includes three longitudinally aligned support members. Disposed between the three support members is a plurality of triangular-shaped gussets, equally spaced apart and vertically aligned inside the body to support the support members. Aligned longitudinally between the support members are three, elongated replaceable bumpers that extend the full length of the elongated body between adjacent support members. Located over each end of the elongated body is an optional end cap. Formed inside each end cap and the end gussets is a centrally aligned bore. Disposed centrally through the bores in the end caps and the gussets is a short, longitudinally aligned pipe. Disposed inside the pipe is a short section of wire rope that is used as a pull handle to move or transport the chock.

19 Claims, 5 Drawing Sheets

AIRCRAFT TIRE CHOCK

This is a utility patent application is based on a provisional patent application (Ser. No. 60/217,982) filed on Jul. 13, 2000.

BACKGROUND OF THE INVENTION

1. Field of the Invention

This invention relates to tire chocks and, more particularly, to tire chocks designed for use with aircraft.

2. Description of the Related Art

An aircraft, resting on the tarmac for loading and unloading with brakes engaged, can still move. Tire chocks are placed around the aircraft tires to prevent movement of the aircraft. Typically, each landing gear on large aircraft consists of two pairs of tires. The tire chocks used around the aircraft tires must be strong enough to sustain the forces exerted on them and prevent the aircraft from rolling. In addition, the chocks must be sufficient in length to extend across two tires. When standard, elongated rubber chocks are used, the weight of the chock is too large for one individual to transport the chock to other aircraft. In order for one individual to manually transport:!the chock, the weight of the chock cannot exceed 50 lbs.

Another concern with aircraft tire chocks is their ability to conduct electricity and to produce sparks when struck or dragged on a surface.

A third major concern with tire chocks is visibility. Tire chocks are relatively small when viewed from a distance and can easily be overlooked by pilots and luggage carrier drivers. In order to prevent tire chocks placed on the airport tarmac or parking areas from being run over at night, reflective tape or paint is used on the contact sides of the chock. Unfortunately, tape or painted surfaces become chipped or scraped and must be replaced on a regular basis.

SUMMARY OF THE INVENTION

It is an object of the present invention to provide a lightweight tire chock capable of being used with an aircraft.

It is another object of the present invention to provide a tire chock that is sufficiently durable to sustain the forces exerted thereon by an aircraft.

It is another object of the present invention to provide such a tire chock that does not conduct electricity or produce sparks.

It is a further object of the present invention to provide such a tire chock that can be placed vertically and used with reflective, adhesive tape or paint which is applied to a protected surface to make the tire chock more visible at night.

These and other objects are met by an aircraft tire chock comprising an elongated body which is triangular in cross-section and designed to be wedged against the rolling surface of an aircraft tire. The elongated body includes three longitudinally aligned support members. Disposed inside the body between the three support members is a plurality of equilateral-shaped, equally spaced-apart gussets. The gussets are spaced-apart to reduce the chock's overall weight. They are also perpendicularly aligned inside the elongated body and used to provide support to the support members and prevent them from collapsing during use. The support members are sufficiently narrow so that a longitudinally aligned slot is created at each apex on the body and between adjacent support members. Aligned longitudinally inside the slots and formed along one edge of the elongated body is an outward extending, replaceable bumper. Each bumper is an elongated structure with a triangular-shaped body section that makes direct contact with the ground when the adjacent support member is placed against the ground. Each bumper has a curved outer surface and an inward extending central member. The bumpers are aligned over the three apexes so that their central members engage a recessed opening formed on each gusset which acts to hold each bumper longitudinally in place on the body.

Located over each end of the elongated body is an optional, equilateral-shaped end cap. In one embodiment, the end caps are made of rubber and include a large, triangular-shaped outer section designed to selectively cover the ends of the bumpers and make contact with the ground for additional traction. In another embodiment, the end cap is a smaller, equilateral-shaped flat plate securely attached over the end of the elongated body.

Disposed longitudinally inside the elongated body is an optional fixed pipe. In the preferred embodiment, the distal end of the fixed pipe extends through the end gusset and interconnects with the internal gussets to provided additional support. The proximal end of the pipe may terminate inside or extend completely through the elongated body.

Attached or secured to the elongated body is a pull handle. In the preferred embodiment, the pull handle is disposed inside the pipe and terminates on the proximal end thereof. The end of the pull handle may be tied into a knot or attached to a crimp nut to prevent the end of the pull handle from being pulled through the proximal end of the pipe when the opposite distal end of the pull handle is pulled. In the preferred embodiment, the pull handle is made of non-electrical conductive material, such as rope or wire rope covered with an outer layer of rubber, so that flow of an electrical current is prevented.

When a large triangular-shaped end cap is placed over the ends of the elongated body, the pipe extends through the end cap. A threaded nut attaches to the distal end of the pipe to selectively attach the end cap to the pipe. When a flat end plate is used in place of the large end cap, the flat end plate is made of metal and may be welded directly to the edges of the support members to permanently attach the flat end plate to the elongated body.

Between the bumpers, the outside surface of each support member is exposed thereby providing a recessed, protected flat surface for reflective adhesive tape or paint to be applied to improve the visibility of the chock at night. In one embodiment, the outside surface of one support member may be covered with an optional raised grip plate that, during use, is placed against the ground to provide a high friction surface for use on snow or ice.

In the preferred embodiment, the support members and gussets are made of lightweight, non-sparking durable material that does not spark when dragged or struck.

DESCRIPTION OF THE PREFERRED EMBODIMENT(S)

Figure 1:
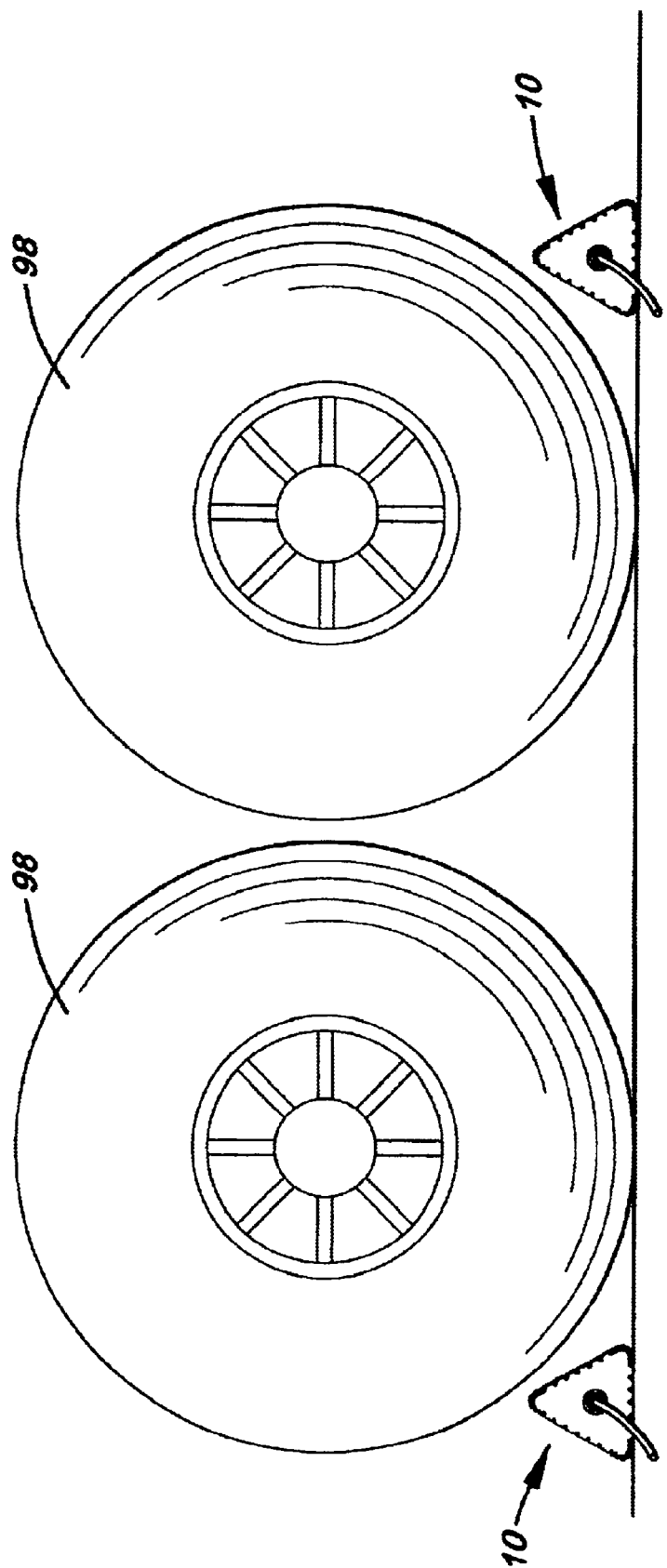
FIG. 1 is a side elevation view of a pair of tire chocks placed in front and behind a pair of tires on an aircraft landing gear.

Referring to the accompanying Figures, there is shown and described an aircraft tire chock 10 comprising a triangular-shaped elongated body 20 designed to fit against the rolling surface of an aircraft tire 98. The elongated body 20 is eighteen to sixty inches in length, with three longitudinally aligned support members 30, 32, and 34, each measuring four to six inches in width. Disposed between the three support members 30, 32, and 34 is a plurality of triangular-shaped gussets 24, equally spaced apart and vertically aligned inside the elongated body 20 to provide support.

Figure 4:
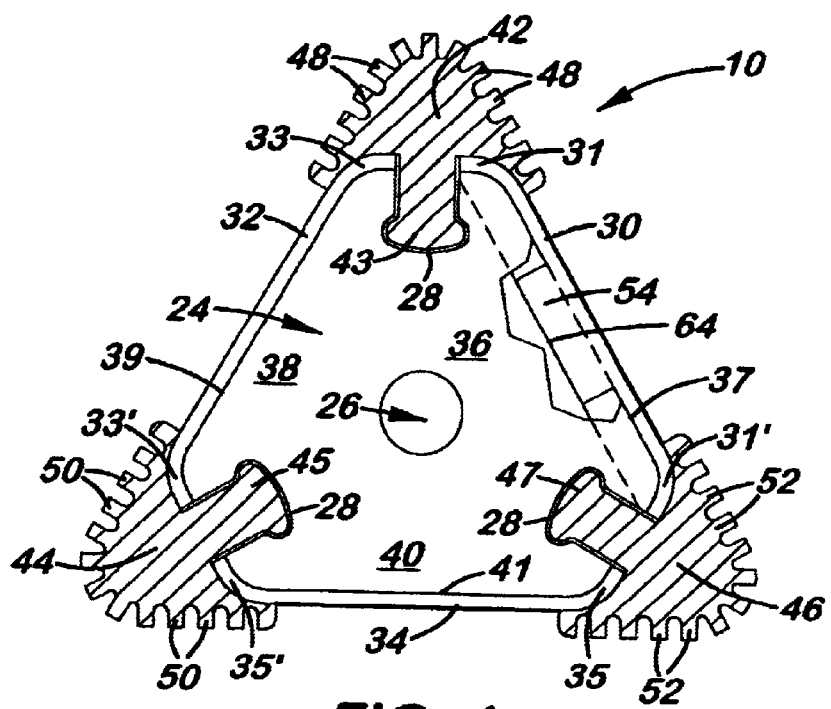
FIG. 4 is a sectional side elevation view of the elongated frame with bumpers attached thereto as shown along line 4—4 in FIG. 3.

As shown in FIG. 4, each gusset 24 is an equilateral triangle with three radially aligned, outward extending legs 36, 38, and 40. The outer edges 37, 39, and 41 of each leg 36, 38, and 40, respectively, are straight and aligned approximately 120° C. apart. During assembly, the three support members 30, 32, and 34 are aligned over the outer edges 37, 39, 41, respectively, on adjacent gussets 24. The support members 30, 32, and 34 are flat plate material, when viewed in cross-section, with inward curved outer edges 31, 31', 33, 33', and 35, 35' respectively. The outer edges 37, 39, 41 on the legs 36, 38, and 40, respectively, are complementary in shape to the outer edges 31, 31', 33, 33', and 35, 35' so that the adjacent support members 30, 32, 34 are fully supported by each gusset 24.

Each gusset 24 also includes three radially oriented bell-shaped openings 28 formed between the extending legs 36, 38, and, 40. During assembly, the bell-shaped openings 28 receive the inward extending central members 43, 45, 47 on bumpers 42, 44, and 46, respectively, to securely hold the bumpers 42, 44, 46 in place between the support members 30, 32, and 34, repectively. Located centrally on each gusset 24 is a bore 26.

During assembly, the three bumpers 42, 44, and 46 are longitudinally aligned between the three support members 30, 32, and 34, respectively. Each bumper 42, 44, 46 is an elongated structure and comprised a triangular-shaped body section and inward extending central members 43, 45, 47. The distal end of each member 43, 45, 47 is bell-shaped and designed to slide longitudinally into the bell-shaped openings 28 formed on the gussets 24. During use, the body section of each of bumper 42, 44, and 46 extends outward and contacts the ground or the rolling surface of the tire 98. Formed on the outer surface of each body section is a plurality of longitudinally aligned treads 48, 50, and 52, respectively, made of durable, high friction material, such as rubber, which is used to provide traction.

Figure 2:
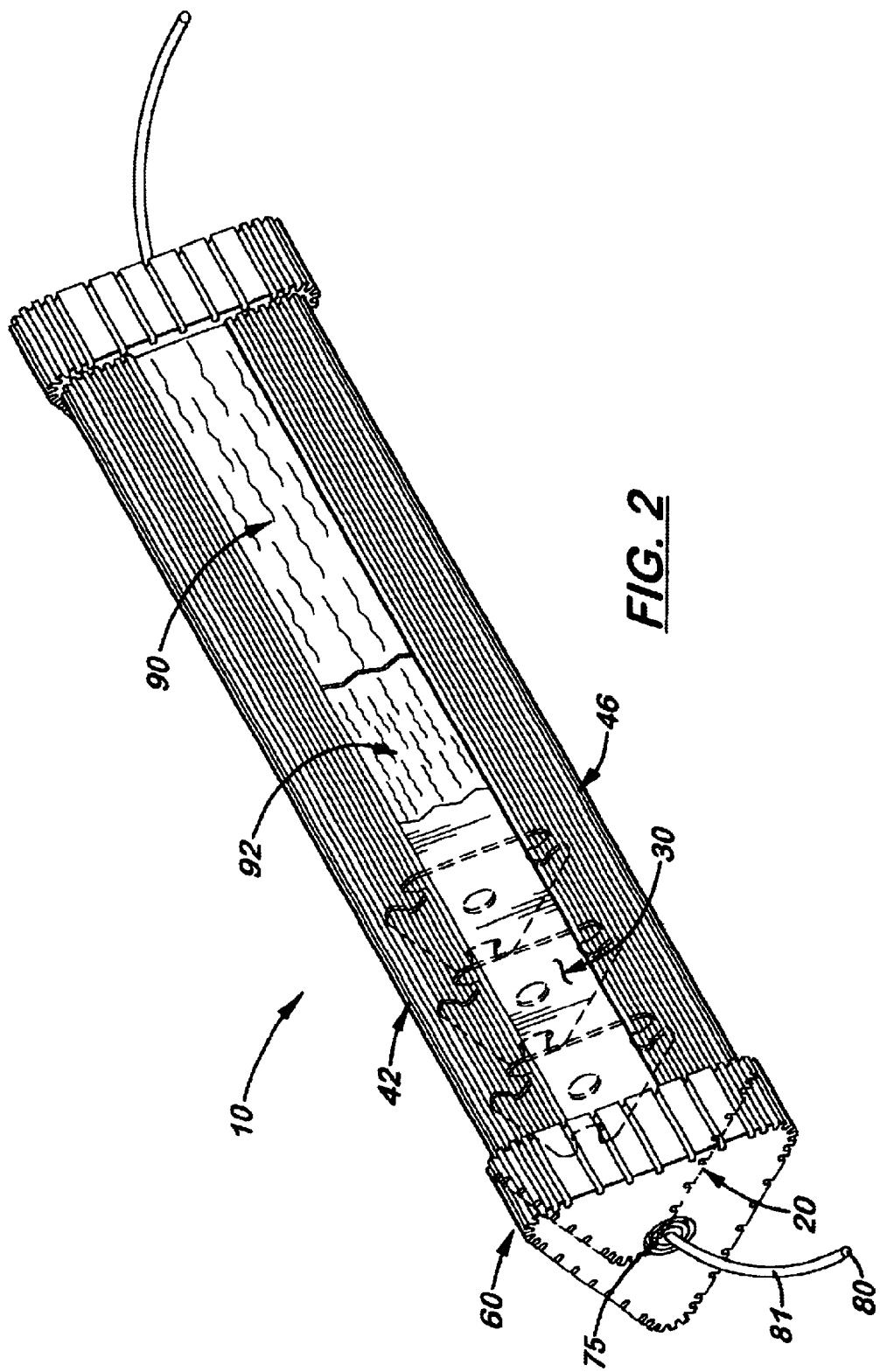
FIG. 2 is a perspective view of an aircraft tire chock.
Figure 3:
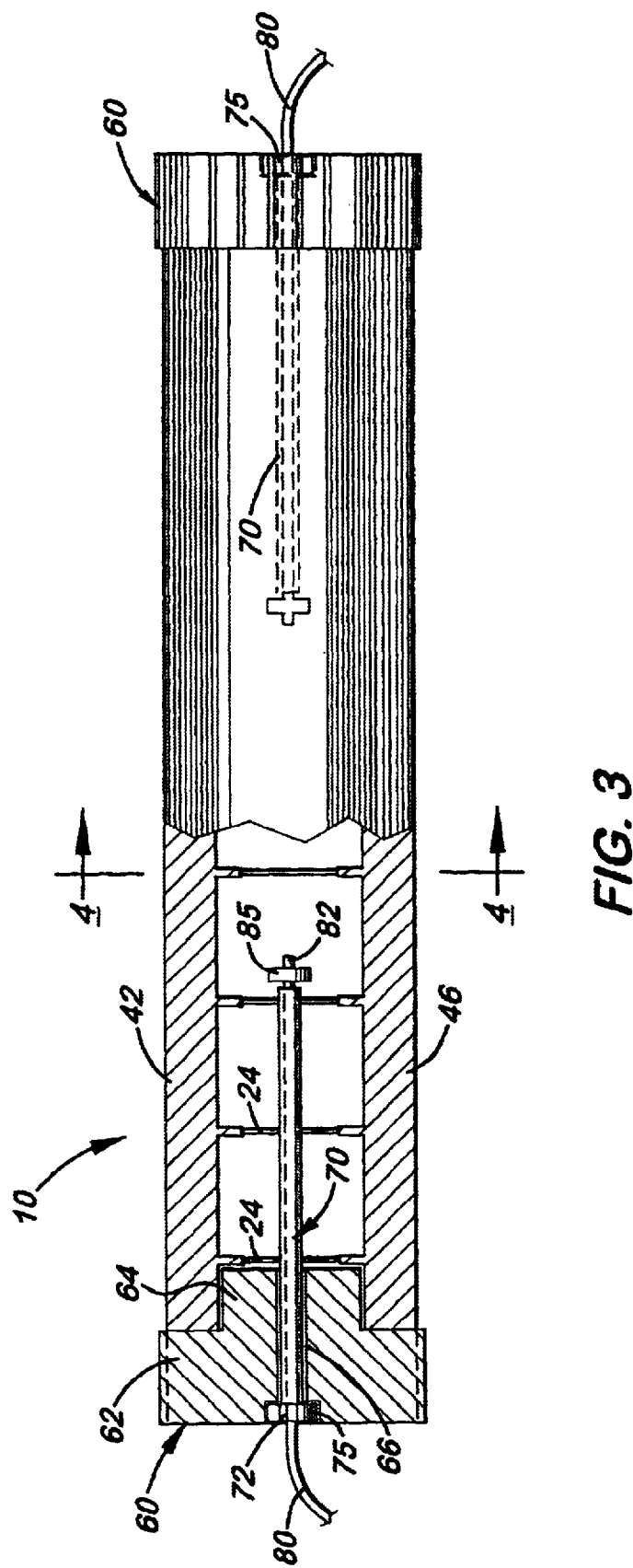
FIG. 3 is a front elevation view of the aircraft tire chock shown in FIG. 2.
Figure 5:
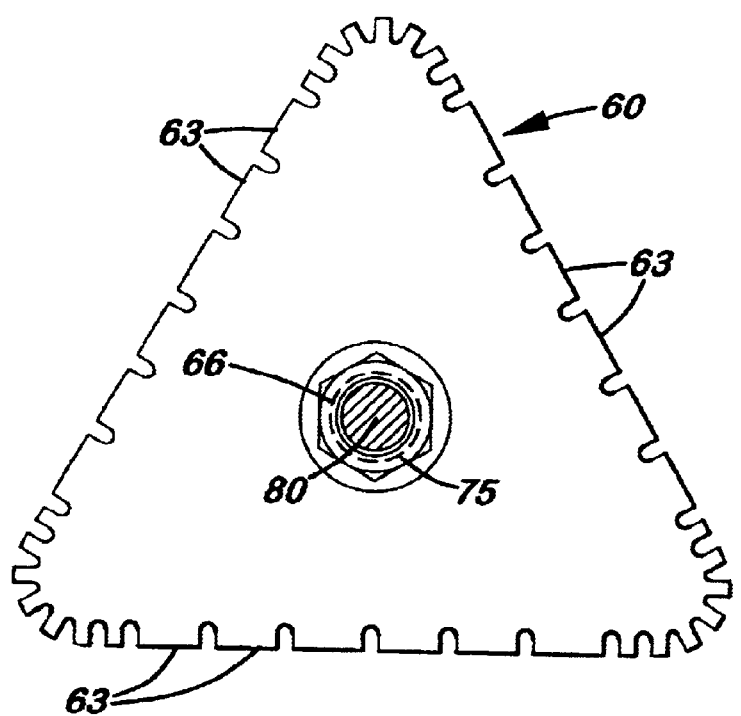
FIG. 5 is a side elevation view of the end cap.

In the first embodiment of the chock 10, a large, removable end cap 60, made of durable high friction material, is disposed over each end of the elongated body 20. The end caps 60 are equilateral triangles sufficient in size to cover the exposed ends of the bumpers 42, 44, 46 to prevent them from sliding longitudinally over the elongated body. As shown in FIGS. 2, 3, and 5, each end cap 60 includes a triangular-shaped outer section 62. Formed on the inside surface of the end cap 60 is a smaller triangular-shaped inner section 64. The inner section 64 is coaxially aligned with the outer section 62 and is approximately the same size and shape as the inside surface of the elongated body 20. During assembly the inner section 64 is inserted into an open end on the elongated body 20. As shown in FIG. 4, tabs 54 extend centrally from each support member (only one tab 54 is shown attached to support member 30) and press tightly against the inner section 64 to partially hold the end cap 60 inside the elongated body 20. The tabs 54 also act to prevent the end cap 60 from rotating inside the elongated body 20. The end cap 60 also includes a centrally aligned bore 66 with a counter sunk opening formed thereon. The outer section 62 also includes optional outer treads 63.

Extending through at least one end of the elongated body 20 is a pipe 70. In the preferred embodiment, the pipe 70 extends a short distance inside the elongated body 20. Formed on the distal end 72 of each pipe 70 are external threads that extend through the outer opening to the bore 66 formed on the end cap 60 when the end cap 60 is aligned over the end of the elongated body 20. A threaded nut 75 is attached to the external threads and is tightened during assembly to hold the end cap 60 on the pipe 70 and hence, the elongated body 20.

Disposed inside the pipe 70 is a section of wire rope 80 that is used as a pull handle when moving or transporting the chock 10. The distal end 82 of the wire rope 80 extends through the proximal end of the pipe 70. When a crimped nut 85 is attached to the distal end 82 of the wire rope 80 to prevent the distal end 82 from being pulled through the pipe 70.

As shown in FIG. 4, the bumpers 42, 44, 46 extend outward beyond the support members 30, 32, 34 and act as contact surfaces against the ground and tires 98. Because the bumpers 42, 44, 46 extend outward, the outer surfaces of the support members 30, 32, 34 are recessed and protected from impacts. Optional reflective tape 90 or paint 92 may be applied to the outer surfaces on the support members 30, 32, 34 to improve the chock's visibility at night.

Figure 6:
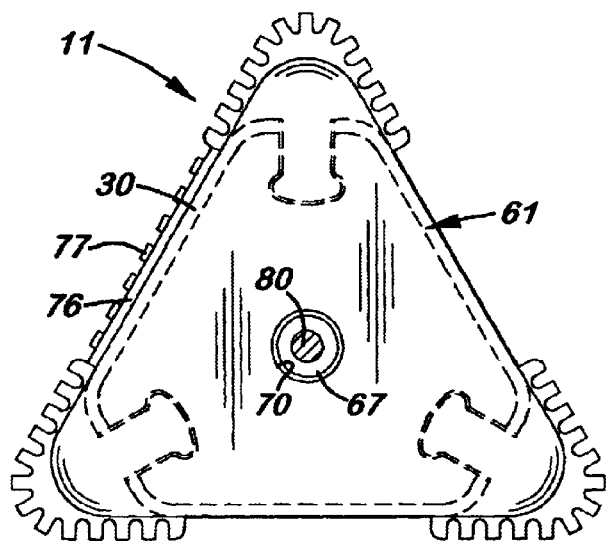
FIG. 6 is a sectional side elevation view of the chock with a flat plate used as an end plate.
Figure 7:
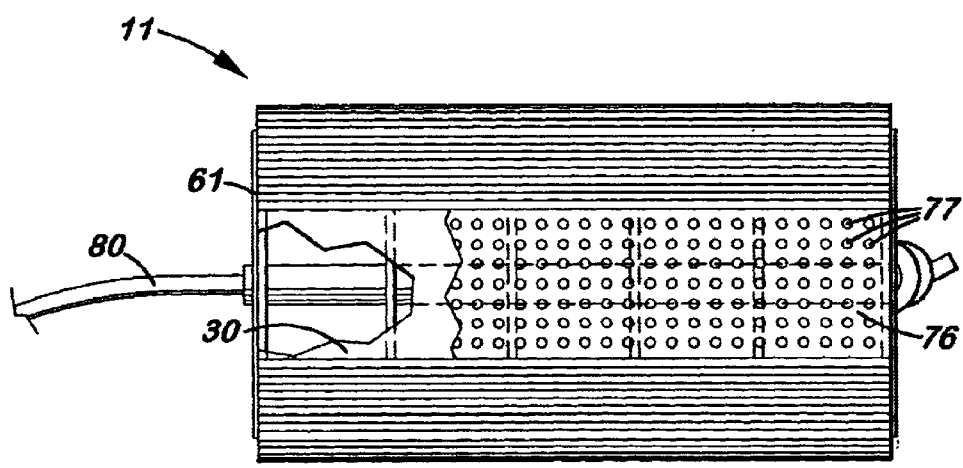
FIG. 7 is a bottom plan view of the aircraft tire chock shown in FIG. 6 with a traction plate attached to the outside surface of the support member.

FIGS. 6 and 7 show another embodiment of the chock 11 in which the end cap 60 is replaced with a flat end cap 61 made of aluminum or similar material. The flat end cap 61 is designed to be aligned and registered over the ends of the elongated body 20. Formed centrally on the flat end cap 61 is a bore 67 through which the distal end of the pipe 70 and wire rope 80 extend. In the preferred embodiment, the edges of the flat end cap 61 are welded to the support members 30, 32,134 and the edges of the bore 67 are welded to the pipe 70.

Also shown is an optional traction plate 76 which is disposed and welded or securely attached to one of the support members (30 shown). The traction plate 76 includes a plurality of raised surfaces 77 designed to press against an icy or snowy surface to improve traction.

In the embodiments 10, 11, the support members 30, 32, 34, gussets 24, and pipe 70 are made of aluminum and are connected together using welding techniques. The overall height of the chocks 10, 11 vary from 12 to 60 inches. The gussets 24 are approximately four to twelve inches apart depending on their intended use and the amount of force to be exerted. The bumpers 42, 44, and 46 and end caps 60 are made of high friction, electrical insulating material to prevent discharged static electricity. The wire rope 80 also includes an outer insulating layer 81 to prevent electrical conduction.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An aircraft tire chock, comprising:
   a. an elongated body with a triangular-shaped cross-section, said elongated body including three, longitudinally aligned support members;
   b. a plurality of triangular-shaped, spaced-apart gussets and located inside said elongated body and used to support said support members on said elongated body, said support members on said elongated body are spaced apart over the three sides of said gussets and sufficient in width to create a slot between adjacent said support members through which bumpers extend and, wherein;
   c. three bumpers are attached to said elongated body, said bumpers extending outward from said elongated body and between said support members to create a contact surface with the ground or a tire surface.

2. The aircraft tire chock as recited in claim 1, further including a pull handle attached to said elongated body.

3. The aircraft tire chock as recited in claim 2, wherein at least one end gusset is disposed near the end of said elongated body, said end gusset including a center bore through which said pull handle extends to connect to said elongated body.

4. The aircraft tire chock as recited in claim 3, further including a longitudinally aligned pipe extending through said center bore formed on said end gusset.

5. The aircraft tire chock as recited in claim 4, further including means to secure one end of said pull handle inside said-elongated body to prevent said pull handle from being removed from said elongated body when pulled.

6. The aircraft tire chock as recited in claim 4, wherein said pipe partially ends through two end caps attached to said opposite ends of said elongated body.

7. The aircraft tire chock as recited in claim 6, further including a selectively attachable locking means to attached each said end cap to said elongated body.

8. The aircraft tire chock as recited in claim 7, wherein said locking means is a set of threads formed on said pipe and a nut selectively attachable to said threads to lock each said end. cap in position on said pipe.

9. The aircraft tire chock as recited in claim 2, wherein said pull handle is a wire rope including a central cable covered with a protective, outer layer.

10. The aircraft tire chock as recited in claim 1, further including means to connect said bumpers to said gussets.

11. The aircraft tire chock as recited in claim 1, further including two triangular-shaped end caps attached to the opposite ends of said elongated body.

12. The aircraft tire chock as recited in claims 11, wherein each said end cap partially extends into said elongated body and is radially locked in position thereto.

13. The aircraft tire chock as recited in claim 11, wherein each said end cap is a flat plate attached to the ends of said elongated body.

14. The aircraft tire chock as recited in claim 1, further including a traction plate attached to the outer surface of at least one of said support members.

15. The aircraft tire chock as recited in claim 1, wherein said support members are made of lightweight, non-sparking material.

16. An aircraft tire chock, comprising:
    a. an elongated body, triangular-shaped in cross-section with three longitudinally aligned support members on said elongated body, said support members spaced apart thereby creating a gap between adjacent said support members;
    b. a plurality of gussets spaced apart and located inside said elongated body and used to support said support members;
    c. three outward-extended elongated bumpers disposed longitudinally between said support members;
    d. a pair of end caps attached to said elongated body; and,
    e. a pull handle attached to said elongated body.

17. The aircraft tire chock as recited in claims 16, wherein each said end cap is triangular-shaped and covers the ends of said bumpers.

18. The aircraft tire chock as recited in claim 16, wherein each said end cap is a flat plate attached to the ends of said elongated body.

19. The aircraft tire chock as recited in claim 16, further including a traction plate attached to the outer surface of at least one of said support members.

* * * * *